United States Patent [19]

Ciccarelli et al.

[11] 3,985,666

[45] *Oct. 12, 1976

[54] PLASTIC MATERIALS MIXED WITH POLAR GROUP CONTAINING MATERIALS

[75] Inventors: Roger N. Ciccarelli; Dale R. Ims, both of Rochester, N.Y.

[73] Assignee: Xerox Corporation, Stamford, Conn.

[ * ] Notice: The portion of the term of this patent subsequent to July 1, 1992, has been disclaimed.

[22] Filed: Apr. 13, 1971

[21] Appl. No.: 133,652

[52] U.S. Cl. .................................. 252/63.2; 427/13; 252/63.7; 252/64; 252/65; 252/66
[51] Int. Cl.² ..................... H01B 3/00; H01B 3/18
[58] Field of Search .................... 256/63.2, 63.7, 64, 256/65, 66, 431 L; 317/262 A, 262 AE; 427/13

[56] References Cited
UNITED STATES PATENTS

| | | | |
|---|---|---|---|
| 2,411,722 | 11/1946 | Harmon et al. | 252/63.7 X |
| 2,438,516 | 3/1948 | New | 252/63.2 X |
| 2,691,007 | 10/1954 | Cass | 252/63.2 X |
| 3,091,606 | 5/1963 | Hsieh | 252/431 L |
| 3,161,539 | 12/1964 | Touey et al. | 252/63.7 X |
| 3,268,494 | 8/1966 | Herbert et al. | 252/63.7 X |
| 3,335,122 | 8/1967 | Trepka | 252/431 L |
| 3,577,346 | 5/1971 | McKeown | 252/63.2 X |
| 3,607,754 | 9/1971 | Asahina et al. | 252/63.2 |
| 3,629,110 | 12/1971 | Hunt | 252/63.2 |
| 3,892,567 | 7/1975 | Ciccarelli et al. | 96/1.1 |

Primary Examiner—Roland E. Martin, Jr.
Attorney, Agent, or Firm—James J. Ralabate; Peter H. Kondo

[57] ABSTRACT

There is disclosed a method for improving and controlling the charge retention of plastic materials. Various such materials and their applications are also disclosed.

4 Claims, 1 Drawing Figure

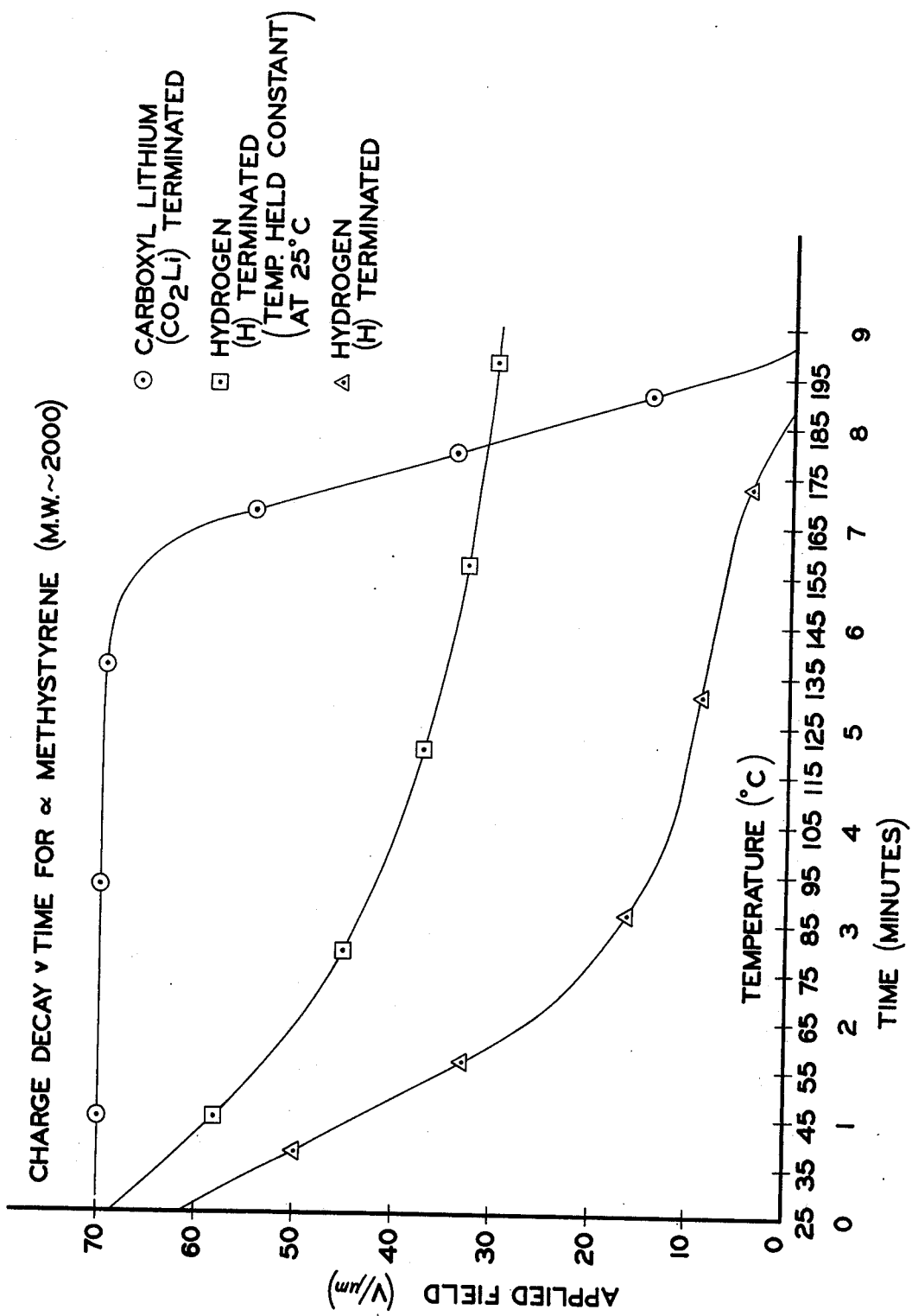

PLASTIC MATERIALS MIXED WITH POLAR GROUP CONTAINING MATERIALS

BACKGROUND OF THE INVENTION

This invention relates to providing functionality to organic and polymeric compounds and more specifically, to improving the charge retention properties of plastic materials. It is known to employ synthetic resins that may be softened by heat and then regain their original properties upon cooling ordinarily referred to in the art as thermoplastics primarily for their structural properties. When these or other synthetic resins are crosslinked to form a three dimensional network of polymer molecules, they solidify or set and cannot be remelted. These materials are commonly known in the art as thermosetting materials and are as in the case of thermoplastic materials employed in many, various and sundry applications for their structural properties. Among these groups of materials, some are employed in addition to their structural properties for their functional properties such as electrical properties. For example, some of these materials are found to be satisfactory for use as dielectrics. Others of these materials are found to be electrically conductive so that they may not be employed in applications where plastic materials are required for their structural properties and in addition, are required to be either less conductive than they are inherently or are required to function as dielectrics. Heretofore, though desirable structural properties have been incorporated into these materials by mechanical and/or chemical means very little has been done to supply and control functionality to this class of materials for electrical properties. Therefore, in a given application where a thermoplastic or thermosetting material has been modified structurally its electrical functionality inherently is known to be modified but unpredictably and uncontrollably. Therefore, though this class of materials has found use in applications where their electrical properties are utilized, for example, in imaging systems such as deformation imaging and for use as dielectrics in various electrostatic applications, their use has been limited by reason of their characteristic electrical properties peculiar to the members of this class of materials. Thus, there is a demonstrated need to provide both thermoplastic and thermosetting materials having desirable electrical properties for various applications.

SUMMARY OF THE INVENTION

It is, therefore, an object of this invention to provide a class of materials devoid of the above noted deficiencies.

It is a further object of this invention to provide a class of organic and polymeric materials having predictable and controllable electrical properties.

Still another object of this invention is to provide a method of incorporating desirable charge retention properties into organic and polymeric materials.

Again, another object of this invention is to provide a novel method of improving the charge retention properties of thermoplastic and thermosetting materials.

Still another object of this invention is to chemically introduce certain groups into existing classes of organic and polymeric materials to appreciably improve their charge retention properties.

These and other objects are accomplished in accordance with the present invention generally speaking by introducing polar (dipole) species into both thermosetting and thermoplastic materials, both of these materials hereinafter referred to as plastic materials. Polar group materials, that is materials having polar groups or polar additives are materials which exhibit dipole moments more fully described in Physical Chemistry, Farrington Daniels, Robert A. Alberty, and John Wiley's Sons Inc., 1955. Introduction of these polar groups is accomplished by blending polar additives into nonpolar (i.e. carbon-hydrogen) plastics, by synthesizing plastics with polar functionality.

Heretofore, when such polar groups such as, for example, compounds containing hydroxyl groups and acid groups were incorporated into a relatively nonpolar and/or less conductive material, the resulting material would be expected to exhibit more conductivity in a classical sense. However, now in accordance with the process of the present invention, it has been determined that upon the addition of materials containing polar groups which are considered conducting in the classical sense for example where two conductive electrodes are used in the system these materials are considered insulating in a xerographic sense i.e., a charge will be supported on the surface of the material, upon the introduction of such highly active polar groups to these materials, although the conductivity increases when considered in the classical sense, the conductivity actually decreases in the xerographic sense. The introduction of these polar groups in magnitudes of parts per million continues to increase the insulation effect in a xerographic sense in such a significant manner so as to provide materials highly useful in certain applications such as deformation imaging, dielectric applications and for use as toners among others. In exceeding a certain critical level it has been found that the material bearing the increased concentration of such polar groups begins to reverse in its insulating properties in a xerographic sense now becoming more conductive in a manner expected in the classical situation.

Thus, for example, alphamethylstyrene may be anionically polymerized followed by carbon dioxide termination to form a polar carboxylic acid or alkali metal carboxylate terminated polymer. Alphamethylstyrene may then be anionically polymerized followed by a methanol termination to form a nonpolar hydrogen terminated polymer. It is found that the polar plastic has substantial charge retention ability, even at elevated temperatures, while the nonpolar material has very little particularly at elevated temperatures and is, therefore, conductive.

In another embodiment alphamethylstyrene is polymerized with butyl-lithium to a molecular weight of about 2,000 followed by carbon dioxide termination. When this material is applied in a deformation imaging mode initial deformation is found to occur when the material is charged at room temperature to a field of positive or negative charge of about 45 volts per micron and then heated to about 175° C. The high softening point of these polymers coupled with the fact that they deform readily signifies that these polar structures hold charge exceptionally well. When alphamethylstyrene is terminated with methanol to form the nonpolar plastic, this material when processed as above does not deform.

In still another embodiment of the process of the present invention styrene is copolymerized with about 10 mole percent methacrylic acid and converted to the lithium and sodium salts respectively having a mean average molecular weight (M) of about 4400. When blended with about 99 wt.% Piccotex 100, a copolymer of vinyltoluene and alphamethylstyrene the blends containing the lithium and sodium salts deform strongly and have high charge retention while those having the acid group deformed to a lesser extent and do not retain charge well.

Though the type of polar group incorporated into the compound has been shown as above described to affect the electrical properties of the resulting material it is found as above explained that the addition of various polar groups is effective to promote the desirable insulating characteristics in a defined range. A straight forward quantitative approach in incorporating polar groups to various plastic materials is difficult to realize because it is extremely difficult to prepare or procure well defined materials having chemically bonded dipole functions in the parts per million range. Alphamethylstyrene terminated by a lithium carboxyl group ($-CO_2Li$) has been prepared with reasonable purity. In most cases, however, analysis run on the resulting compounds have indicated that the concentration of metal ion is higher than that expected quantitatively. It has been found that in alphamethylstyrene reactions excess metal ion apparently results from secondary reaction leading to inorganic salts and catalyst products.

Although a quantitative approach has shown difficulty in application it has been found in the above lithium compound that optimum electrical properties have generally been incorporated into this plastic material when about 100 ppm of Li to about 6,000 ppm of Li is incorporated therein. When from about 6,000 to about 10,000 ppm of Li is incorporated therein satisfactory properties are observed, and at about 10,000 ppm or more poor electrical properties are observed.

When calculating ppm for materials other than lithium, the proper correction factors must be applied based on the respective molecular weights of the polar function. So it has been determined that for any plastic material which is comprised of identifiable monomeric units an addition of from about one polar group per 1,000 monomeric units to about one polar group per 5 monomeric units is found to be the range of polar group concentration below and above which unsatisfactory results are obtained. Where the plastic material is not comprised of identifiable monomeric units the range of polar group concentration may be expressed in terms of mole percent so that the addition of about 0.1 mole % to about 20 mole % of polar groups defines the above range of which 0.1–10 mole percent is preferred. Still another method used, relates to expressing additive groups in terms of groups per backbone carbon which results in the above defined ranges being expressed as 1 polar group per 2,000 backbone carbon atoms to 1 polar group per 10 backbone carbon atoms for polymers made from ethylenically unsaturated monomers.

Any suitable plastic material may be employed in the process of the present invention. Typical plastic materials include silicone oligomers and polymers; aromatic oligomers and polymers including poly-styrene, vinyltoluene, substituted vinyltoluenes, alpha-methylstyrene, halogen derivatives thereof and copolymers and mixtures thereof; polyacrylic acids, methacrylic acids, esters thereof and copolymers thereof; aliphatic amorphous hydrocarbons including polybutenes, polyisobutylenes and highly branched aliphatics having molecular weights <5000; phenoxy oligomers and polymers of poly ortho, meta, and para-phenoxy compounds; triazine and cyanuric acid derivatives.

Any suitable compound having polar groups may be employed in the process of the present invention. Typical compounds having polar groups include halides, esters, ethers, epoxys, quaternary amines; hydroxyl, phenolic, sulfonic acid, carboxylic acid, and the metal salts of these, such as, Li, Na, K, Mg, Ca, Ti, Cr, Fe, Co, Ni, Cu, Ag, Zn, Cd, Al, Sn, As, Se, Te; alcohols, organic acids and the metal salts thereof, carbon chlorine compounds, carbonyl compounds, hydroperoxides, and carboxylic esters. Of these the metallic salts are preferred, for example, the lithium and sodium salts of carboxyl containing polymers and copolymers. Polymers having incorporated therein copper and tin salts have also shown satisfactory results.

Any suitable method of introducing the polar groups into a plastic material may be employed in the process of the present invention. Typical methods include anionic polymerization, copolymerization, organic synthesis reactions on prepared polymers, standard polymerization methods and blending of polar containing materials in the nonpolar materials.

The general nature of the invention having been described, the specifics of the process of the present invention will be better understood with respect to its employment and results obtained therefrom by an understanding of FIG. 1 in which is seen the charge decay of a plastic material as it is controlled by the incorporation of polar groups. The data in this figure is taken from approximately 2 micron thick films of $-CO_2Li$ terminated polyalphamethylstyrene and hydrogen terminated alphamethylstyrene $\bar{M}_n$ equals about 2,000 (number average molecular weight) on about 50 mil aluminum plates. A plot of field in volts per micrometer versus time and temperature is illustrated. Temperature was varied in a controlled manner to increase a rate of about 20° C per minute using a Hewlett Packard Model 240 Temperature Programmer. The material is negatively charged at room temperature, placed on the programmed hot stage with voltage monitored by a Monroe Electronics Isoprobe Electrostatic Voltmeter Model 144S-2 as the temperature is increased. From an analysis of the figure, it can clearly be seen that the polar containing plastic retains charge significantly better than both the nonpolar hydrogen terminated polymers. For the nonpolar thermoplastics the charge decays rapidly with increasing temperature.

DESCRIPTION OF THE PREFERRED EMBODIMENTS

To further define the specifics of the present invention the following examples are intended to illustrate and not limit the particulars of the present invention. Parts and percentages are by weight unless otherwise indicatd.

EXAMPLE I

In a first reaction about 0.1 mole of cyanuric chloride is dissolved in about 125 ml. of Baker Reagent acetone. About 0.3 moles of m-(m-phenoxy phenoxy) phenol is dissolved in an aqueous sodium hydroxide solution comprising about 125 ml. of deionized water and 12 grams of sodium hydroxide under an inert gas. The sodium m-(m-phenoxy phenoxy) phenate is then added to the cyanuric chloride acetone solution at about −10° C dropwise over a period of about 1 hour. The mixture so obtained is stirred for about 1 hour at about −10° C and then stirred for about 2 hours at room temperature and finally for about 4 hours at reflux (57° C). About 300 ml. toluene is added and the water from the mixture is decanted. The toluene is washed with about 200 ml. of about a 2% sodium carbonate solution, twice with deionized water, then with 200 ml. of about a 5% hydrochloric acid solution, and finally twice with deionized water. The toluene solution is dried overnight over a molecular sieve 4A. The toluene is removed in a flash evaporator while heating to a temperature of about 150° C at about 4 millimeters (mm) mercury (Hg.) obtaining a yield of about 91% of the first reaction product which is 1,3,5-tri (m-phenoxy phenoxy phenyl) cyanurate having a molecular weight of about 922 and substantially the following analysis: C—74.93%, H—4.38%, N—4.57%, O—16.00% and Na about 36 ppm.

In a second reaction about 0.1 mole of cyanuric chloride is dissolved in about 125 ml. of Baker Reagent acetone. About 0.2 moles of m-(m-phenoxy phenoxy) phenol is dissolved in an aqueous sodium hydroxide solution comprising about 125 ml. water and 16 grams sodium hydroxide reagent grade under an inert gas. The sodium m-(m-phenoxy phenoxy) phenate is added to the cyanuric chloride-acetone solution at about −10° C dropwise over a period of about one hour. The mixture is stirred for about 1 hour at about −10° C, then about 4 grams of sodium hydroxide in about 50 ml. of water is added. The mixture is then stirred for about 2 hours at room temperature, and finally for about 4 hours at reflux (57° C). About 300 ml. of toluene is added and the water removed by decantation. The toluene solution is washed twice with water. The toluene solution is dried overnight over a molecular sieve 4A and finally the toluene is removed by flash evaporation. The second reaction product so obtained is found to have a molecular weight of about 946 and substantially the following analysis: C—73.6%, H—4.43%, N—5.10%, O—14.82%, and Na—1.77%. A blend is made of 75 weight percent of the first reaction product with 25 weight percent of the second reaction product. The plastic material so obtained when cast in a film exhibits excellent charge retention ability.

EXAMPLE II

Under a vacuum of about $10^{-5}$ mm Hg. about 0.085 mole of alphamethylstyrene and about 100 ml. of tetrahydrofuran are distilled into a reaction vessel. This mixture is cooled to about −78° C with dry ice acetone bath. Initiation is accomplished with about 3.1 ml. of n-butyllithium (about 1.6M in n-hexane). The reaction mixture is removed from the bath and allowed to warm to room temperature until a deep red color appears. It is then cooled in a dry ice acetone bath and stirred overnight. Termination of the reaction is accomplished by rapidly bubbling dry carbon dioxide through the mixture with stirring. The polymer is isolated by desolvation under vacuum. It is then redissolved in toluene and precipitated from a large excess of spectral grade methanol. After filtration and drying a yield of about 5 grams of the polymer is obtained. The material so obtained is found to have superior charge retention properties relative to alphamethylstyrene when cast into a film and is found to have a molecular weight of 2078 and substantially the following analysis: C—88.92%, H—8.54%, O—1.61%, and Li—2750 ppm.

EXAMPLE III

About 600 grams of diphenyl ether is heated to about 200° C to which is added a solution of about 1.77 moles of styrene and about 0.194 moles of methacrylic acid dropwise over a period of about 2 hours. After heating for an additional hour the mixture is cooled to room temperature then added dropwise to a large excess of methanol. After filtration and drying a yield of about 130 grams of polymer is obtained having a molecular weight of about 4338 and the following analysis is obtained: C—89.20%, H—7.69%, O—3.17%, and an acid member (mg KOH/gm) 54.43. One weight percent of the prepared polymer is blended with about 99 weight percent of a copolymer of styrenevinyltoluene. When the mixture is cast into a film the charge retention ability is found to be better than the styrenevinyltoluene alone, particularly at elevated temperatures.

EXAMPLE IV

The copolymer as produced in Example III is reacted in toluene with about a 10 mole percent excess of sodium methoxide. The polymer salt is isolated by precipitation from isopropyl alcohol thus obtaining a plastic material having a molecular weight of about 4800 and the following analysis: C—85.6%, H—7.59%, and Na—2.48%. One weight percent of the prepared polymer is blended with about 99 weight percent of a copolymer of styrene-vinyltoluene. When the mixture is cast into a film charge retention ability of the sodium salt polymer is found to be better than the free acid copolymer.

EXAMPLE V

The acid copolymer as produced in Example III is reacted in toluene with about a 10 mole percent excess of lithium hydroxide monohydrate. The reaction is driven to completion by azeotroping off the theoretical quantity of water. The polymer salt is then isolated by desolvation under vacuum, thus producing a plastic material having the following analysis: C—87.68%, H—7.72%, O—3.42%, and Li—0.67%. One weight percent of the prepared polymer is blended with about 99 weight percent of a copolymer of styrene-vinyltoluene. When the mixture is cast into a film the charge retention ability of the lithium salt polymer is found to be better than the free acid copolymer.

EXAMPLE VI

A copolymer of styrene-vinyltoluene is dissolved in cyclohexane and subjected to ozonolysis by bubbling ozone through the solution until a film of the polymer exhibits strong carbonyl and hydroxyl absorptions under infrared spectroscopy. When the polymer so obtained is cast into a film on an aluminum substrate it is found to have superior charge retention properties relative to the starting material.

EXAMPLE VII

A film is cast from a mixture of 10 weight percent polyvinyl chloride and 90% styrene-vinyltoluene copolymer in methylethylketone on aluminum substrate. The coating is found to have superior charge retention properties similar to those of the product as obtained in Example VI.

Although the present examples are specific in terms of conditions and materials used, any of the above listed typical materials may be substituted when suitable in the above examples with similar results. In addition to the steps used to carry out the process of the present invention, other steps and modifications may be used, if desirable. For example, in addition to the conventional purification processes employed as described above sophisticated forms of purification may be employed to further refine the product obtained and substantially increase the reproducibility of same. In addition, other materials may be incorporated in the process of the present invention which will enhance, synergize or otherwise desirably affect the properties of the systems for their present use. For example, a terpolymer of methylmethacrylate, styrene, and vinyltriethoxysiline may be employed in the process of the present invention to provide a material suitably adapted for use as a carrier in electrophotography.

Anyone skilled in the art will have other modifications occur in the base of the teaching of the present invention. These modifications are intended to be encompassed within the scope of this invention.

What is claimed is:

1. A method of improving the charge retention ability of a plastic material comprising providing a plastic selected from the group consisting of styrenes, methacrylic acid, m-(m-phenoxy phenoxy) phenol, styrene-vinyltoluene copolymers, cyanuric acid derivatives and mixtures thereof incorporating in said plastic a compound having polar groups said compound being selected from the group consisting of butyl-lithium, carboxylic acids, alkali metal carboxylates, lithium salts, sodium salts, copper salts, tin salts, carbon chlorine compounds and mixtures thereof and applying a charge to the surface of said material; with the proviso that the plastic and polar groups concentration is defined such that;
   a. when said plastic material is composed of identifiable monomeric units the polar group is present in an amount of about 1 polar group to about 1,000 monomeric units to about 1 polar group per 5 monomeric units;
   b. when said plastic material is not comprised of identifiable monomeric units the range of polar group concentration may be expressed in terms of mole percent so that addition of about 0.1 percent to about 20 mole percent of polar group defines the above range;
   c. when said plastic material is made from ethylenically unsaturated monomers the range of polar groups may be expressed as about 1 polar group per 2,000 backbone carbon atoms to about 1 polar group per 10 backbone carbon atoms.

2. The method of claim 1 wherein said plastic material is alphamethylstyrene and said compound containing polar groups contains lithium.

3. The method of claim 2 wherein said lithium is incorporated in a range of about 100 ppm to about 6,000 ppm.

4. The method as defined in claim 1 wherein said plastic material is not composed of identifiable monomeric units and about 0.1 to about 10 mole percent of the polar group material is incorporated into said plastic material.

* * * * *